A. P. RUNGE.
LEVELING INSTRUMENT.
APPLICATION FILED APR. 24, 1917.
1,267,456.
Patented May 28, 1918.
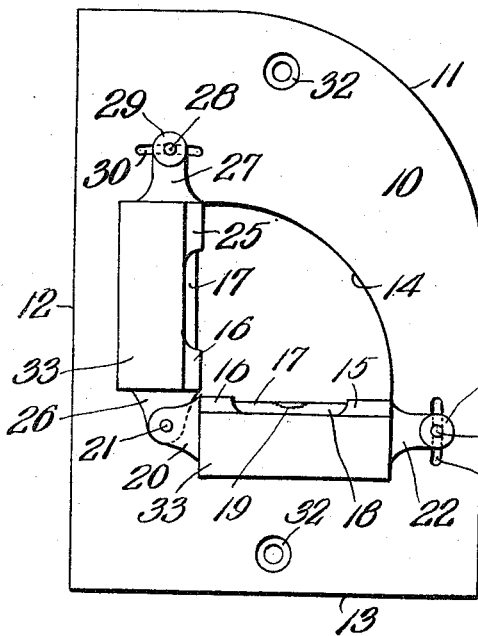
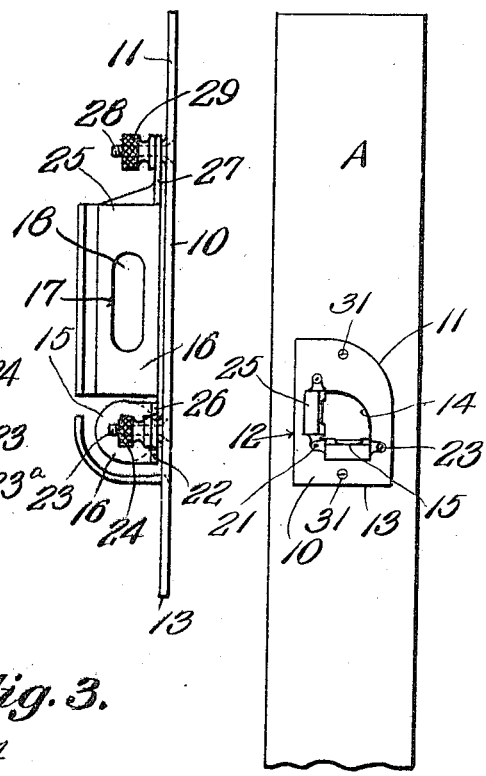
WITNESSES
INVENTOR
Andrew P. Runge,
BY
ATTORNEY

UNITED STATES PATENT OFFICE.

ANDREW P. RUNGE, OF BLUE ISLAND, ILLINOIS.

LEVELING INSTRUMENT.

1,267,456.  Specification of Letters Patent.  Patented May 28, 1918.

Application filed April 24, 1917. Serial No. 164,258.

*To all whom it may concern:*

Be it known that I, ANDREW P. RUNGE, a citizen of the United States, residing at Blue Island, in the county of Cook and State of Illinois, have invented certain new and useful Improvements in Leveling Instruments, of which the following is a specification.

This invention relates to an improvement in leveling devices, and more particularly to an adjustable level and plumb for the use of carpenters, brick layers, and all mechanics who are required to level and plumb floors, walls, piping and other objects to be laid or erected, the invention having for its principal object the provision of a plate upon which are mounted two spirit levels arranged at an angle of 90° to each other and pivotally connected to the plate in such manner as to be adjusted to a limited extent when necessary to obtain absolute accuracy in the position of the bulbs.

Another object of the invention is to provide an adjustable level and plumb mounted upon a plate having two edges perpendicular to each other and the bulbs of the two levels adjustable to said edges, the whole forming a complete level and plumb when required to be used in a short space or which may be fastened upon a straight edge when it is desired for leveling or plumbing extensive surfaces. The bulbs of the levels being adjustable in either case to the true edge or edges of the straight edge or the plate upon which the bulbs are mounted.

A still further object of the invention is to provide an adjustable level and plumb made of few parts, of simple and economical construction that can be quickly and with little trouble rendered absolutely accurate when used on its mounting plate alone for small work or upon a straight edge for more extended surfaces.

With these as the principal objects in view, the invention consists in the novel construction, combination and arrangement of parts hereinafter set forth, pointed out in the appended claims, and illustrated in the accompanying drawings, in which—

Figure 1 is a face view of the plumb and level complete,

Fig. 2 is an edge view as viewed from the right of Fig. 1,

Fig. 3 is an edge view as seen from the lower side of Fig. 1,

Fig. 4 is a face view of a level and plumb on reduced scale attached to a straight edge.

In the drawings, 10 indicates a base plate made preferably of sheet steel of substantially rectangular form with one corner cutaway as a quadrant, as at 11. Two edges of the plate indicated by 12 and 13 are made absolutely true and at right angles to each other, these edges being employed when it is desired to level and plumb small articles. In the center of the plate is an opening 14 of quadrant shape, the two right angular sides of which are parallel to the edges 12 and 13, respectively. At one of the straight edges of the opening 14 is mounted a spirit level 15 of the usual construction and comprising a cylindrical metal casing 16 cut away as at 17 on the side that will be uppermost when the instrument is in use to expose a tubular glass bulb 18 mounted in the casing 16 and containing a fluid that normally fills the bulb, a bubble of air 19 only being left unoccupied by the fluid. At one end of the casing 16 is a projecting ear 20 that lies close to the plate 10 and is pivotally mounted thereon by a pin 21 passing through an opening in the ear 20. At the opposite end of the casing 16 is a somewhat similar ear 22 having a perforation therein for the passage upwardly through the plate 10 and said ear of a screw 23, the head of which is seated in a counter-sunk recess in the under side of the plate, the screw itself passing through a curved slot 23ª in the plate concentric with the axis of the pivot 21. A thumb nut 24 is threaded on the upper end of the screw 23 to lock the spirit level to the plate 10. By this means it will be seen that the spirit level 15 may be given a limited movement on the pin 21 in order to perfect its adjustment with either edge 12 or 13 of the plate 10.

A second spirit level 25 is mounted on the plate 10 at the upper straight edge of the opening 14 perpendicular to the level 15 and, like the level 15, comprises a tubular metal casing 16 with a tubular glass bulb 17 mounted therein. An ear 26 extends from the lower side of the level 25 and is mounted upon the pivot pin 21 that secures the ear 20 of the other level to the plate 10. From the upper end of the level 25 an ear 27 projects and is adjustably connected to the plate 10 by a screw 28 and nut 29, said screw passing through a curved slot 30 in the plate, the construction being similar to the adjusting means for the first described level.

Two spirit levels as thus described may be quickly and accurately adjusted to the edges 12 and 13 of the plate 10 and when used, in connection with a straight edge as A Fig. 4, the plate 10 is secured thereon by means of screws 31 passing through countersunk openings 32 in the plate 10 and into the straight edge. After the plate is secured in place, the levels 15 and 25 will be adjusted to one edge or the other of the straight edge as will be readily understood.

As a protection for the spirit levels 15 and 25 each is covered by a hood 33 rising from the plate 10 on the outer side of each level and curving over the top of the same. These hoods may be mounted upon the plate or if desired may be a portion of the plate itself that was cut away to form the opening 14 and bent upwardly to form the hood as shown.

In use either edge 12 or 13 of the instrument shown in Fig. 1 may be used as a level or as a plumb, and in either instance the hollow spirit level 15 or 25 will indicate the accuracy of the surface tested. When used with a straight edge as A the level 25 will indicate the accuracy of the surface when the straight edge is used for leveling, while the instrument 15 will give accuracy when plumbing.

What I claim is:

1. A leveling instrument comprising a plate having two edges perpendicular to each other, a pair of spirit levels pivotally connected to each other at one end and to said plate and disposed in perpendicular relation, a hood rigid with said plate projecting upwardly therefrom and over each level, and an independent adjusting means on each level comprising a pin thereon extending through a slot in the plate and fitted with a nut for accurately truing the level to the perpendicular edges of the plate.

2. A leveling instrument comprising a plate having two edges perpendicular to each other, a spirit level parallel to each of said edges, each of said levels having an ear projecting from one end and overlapping the corresponding ear on the other level, a pin extending through said ears and into said plate for pivotally mounting said spirit levels, an ear projecting from the opposite end of each of said levels, screw pins each passing through a slot in said plate and through one of said ears to permit limited adjustment of the levels, and a nut on each screw to secure the levels in position after adjustment.

In testimony whereof I affix my signature in presence of two witnesses.

ANDREW P. RUNGE.

Witnesses:
CHAS. ODENTHAL,
EDW. E. DIEFENBACH.